May 20, 1952  A. O. REINKING  2,597,128
BOTTLE HANDLING DEVICE
Filed June 10, 1947  2 SHEETS—SHEET 1
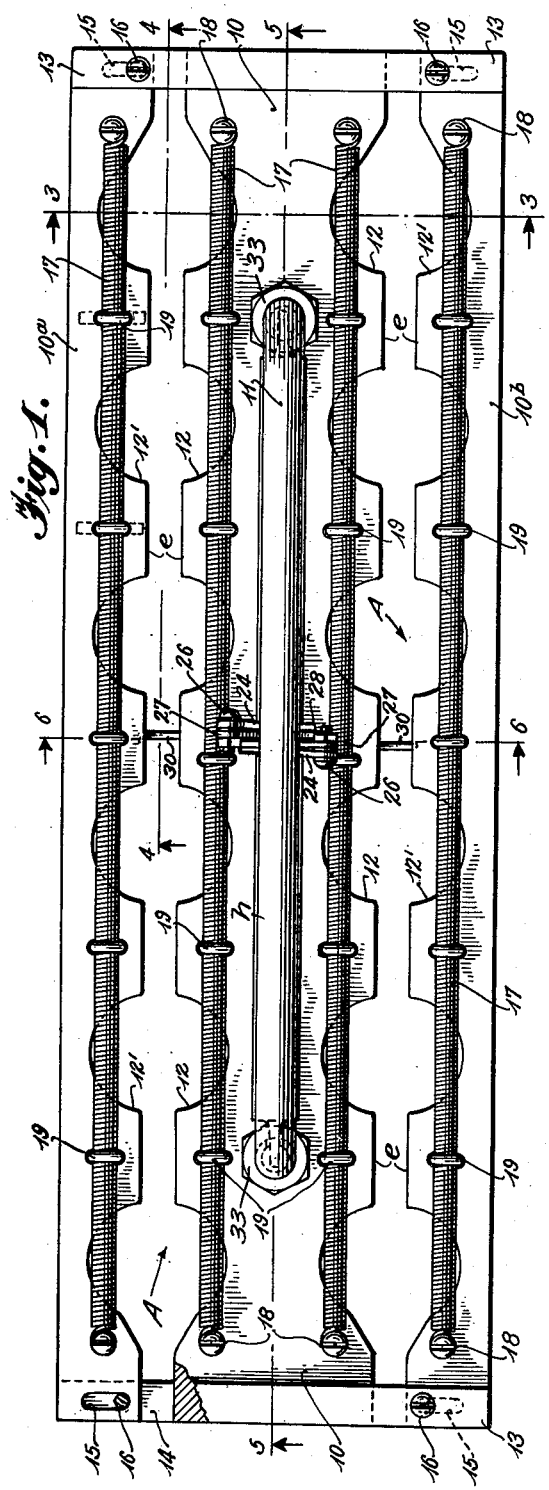
INVENTOR
*Arthur O. Reinking*
BY
ATTORNEY May 20, 1952
A. O. REINKING
2,597,128
BOTTLE HANDLING DEVICE
Filed June 10, 1947
2 SHEETS—SHEET 2
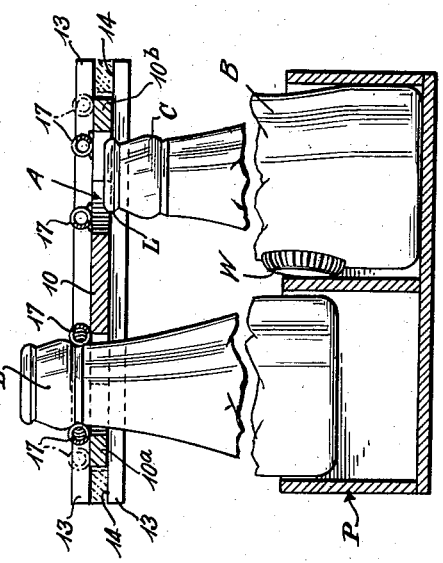
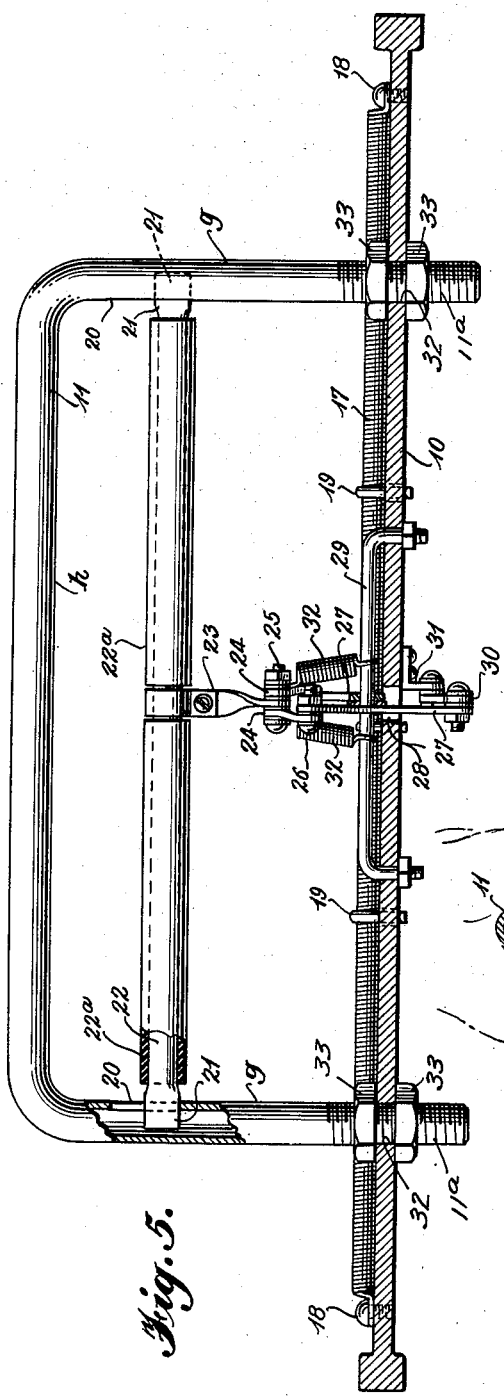
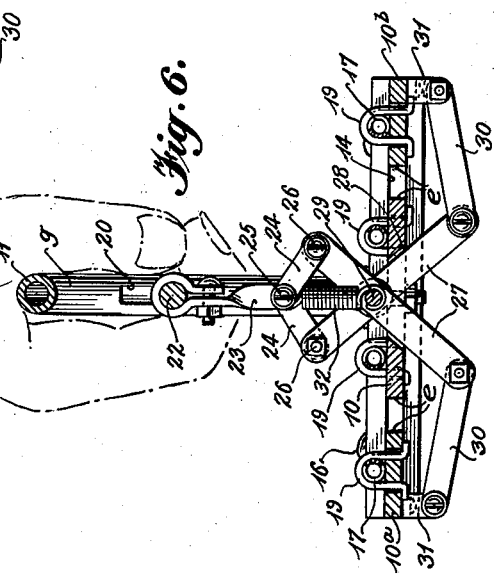
INVENTOR.
Arthur O. Reinking
BY
ATTORNEY Patented May 20, 1952

2,597,128

UNITED STATES PATENT OFFICE 2,597,128

BOTTLE HANDLING DEVICE

Arthur O. Reinking, Oaklyn, N. J.

Application June 10, 1947, Serial No. 753,688

13 Claims. (Cl. 294—87.26)

This invention relates to bottle handling apparatus and more particularly to a portable device for gripping and supporting a plurality of bottles, or jars, in spaced relation to each other.

Bottles such as are used for carbonated beverages, or so-called soft drinks, beer, milk and similar beverages are capable of being used a number of times—that is, after the bottles have been emptied they are returned to the bottling plant where they are cleaned and sterilized and then refilled for resale. Bottles of this type are usually packed in cases for transport to and from the bottling plant. These cases have partitions dividing their interior into compartments, each of which is adapted to receive a bottle. These cases usually hold four rows of bottles with six bottles in each row so that the bottles are arranged in rows in spaced relation to each other. The compartments formed by the partitions are of such size as to freely receive a bottle but to restrict lateral movement of the bottle to prevent adjacent bottles from contacting each other to avoid breakage during the handling of the case.

When the cases of bottles are returned to the bottling plant, the bottles are removed from the cases and are fed to or placed in a machine, known as a "soaker," where they are subjected to a cleaning and sterilizing process to prepare them for refilling. The soaker is adapted to handle large quantities of the bottles at a rapid rate and the bottles are ordinarily fed into the machine by a conveyor device to which the bottles must be fed from the cases. It has been customary to feed the bottles to the conveyor by hand and usually two men are required in order to place the bottles thereon so that the feeding apparatus can be supplied with bottles at a sufficient rate that the efficiency of the machine is not cut down. The customary way of feeding the machine is for an operator to pick up two bottles in each hand from the case and place the bottles on the conveyor. Thus, the two men who are usually employed for this job can place a maximum of eight bottles on the conveyor in one operation.

This hand feeding operation involves a number of difficulties. In order to feed the soaker machine at the proper rate, the operators must work extremely fast to maintain production. This brings on fatigue very rapidly and requires more operators to accomplish full production and, consequently, the job has been one that has been avoided by the employees of the bottling plant. Furthermore, due to carelessness on the part of the employees the bottles have been knocked together in handling them and there has been a very high percentage of breakage, particularly in chipping or breaking the bottoms of the bottles. This breakage has run anywhere from 1% to 1½%. Of course, this carelessness has been increased because the operators have always had to hurry in order to keep up with the machine as well as because of rapidly developed fatigue.

Additional difficulty has been encountered by employee injury due to cut fingers and hands. A number of bottles in the cases are broken or chipped, particularly the collars and/or lips around the mouths of the bottles are chipped when the caps are removed. Therefore, when the operators would grip these bottles between their fingers they would be cut by the sharp edges left by the chips, particularly if the bottle was jammed or stuck in its compartment by the removed cap or other foreign matter. Consequently, the operators must watch very carefully for broken bottles and this cuts down on the speed of operation.

It has been proposed, heretofore, that bottle handling devices be employed for picking up a plurality of bottles simultaneously so as to increase the rate feed to the soaker and to eliminate operator injury due to the handling of broken bottles. These devices have not proven satisfactory, however, particularly due to the fact that they have not been adapted to accommodate bottles that have been stuck in the cases. These prior art devices are so arranged that they positively grip each of the bottles but have not been capable of releasing one bottle without releasing at least several additional bottles. The gripping means of the prior proposals has been arranged to grip several bottles between the same members and, consequently, when the members have been separated to release a stuck bottle, they would also release at least several adjacent bottles. Therefore, all of the bottles in a group, including a stuck bottle, must be hand fed. Consequently, these prior devices have not been successful and have enjoyed but small use in the bottling plants.

Having in mind the defects of the prior art apparatus, it is an object of this invention to provide a bottle handling device that is capable of gripping a plurality of bottles simultaneously and of releasably gripping each bottle individually so that a stuck bottle will readily be individually released without releasing other bottles of the group.

It is another object of the invention to provide a bottle handling device for gripping a plurality of bottles in spaced relation and to releasably grip each of the bottles individually so that each bottle will be released automatically if it is stuck in its case.

It is another object of the invention to provide a bottle handling device for gripping a plurality of bottles in spaced relation and to resiliently and yieldably grip each of the bottles individually.

It is a further object of the invention to provide a bottle handling device that accomplishes the aims of the above stated objects which has a very simple and effectively operating construction and organization that may be manufactured and assembled very cheaply and with celerity and which, from actual experience, eliminates between 40% to 50% of the normal bottle breakage in the bottling plant.

The foregoing objects and others ancillary thereto are preferably accomplished, in accordance with the preferred embodiment of the invention, by a bottle gripping device comprising a central supporting member having complemental supporting members on each side thereof and which are movable relative to said central support member; said supporting members having resiliently flexible gripping elements supported along the opposed edges. A handle is carried by the central member for lifting; and associated with the handle is a manually operable device connected to the movable supporting members by a toggle linkage to move said members toward each other to bring said gripping elements into contact with the necks of rows of bottles which may be straddled by or extended between adjacent edges of members when said adjacent edges of said members are spaced sufficiently apart.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout and in which:

Figure 1 is a top plan view of a bottle handling device in accordance with the present invention;

Figure 2 is a fragmentary top plan view showing the bottle grips in operative position and with the necks of the bottles in cross section;

Figure 3 is a cross sectional view taken transversely through the device on line 3—3 of Fig. 1;

Figure 4 is a fragmentary cross section view taken on line 4—4 of Fig. 1;

Figure 5 is a cross sectional view taken longitudinally through the device on line 5—5 of Fig. 1;

Figure 6 is a cross sectional view taken transversely through the device on line 6—6 of Figure 1; and Figure 7 is a cross sectional view showing a modified construction.

Referring now to the drawings, specifically to Fig. 1, a bottle handling device, in accordance with the present invention may comprise three elongated strips or bars 10, 10a and 10b, of rigid material, arranged with their planar surfaces in the same plane and with side-edge to side-edge and mounted for relative lateral movement to separate or bring together their opposing edges e, these strips forming, what are here termed, supporting members. The central supporting member 10 has a bail-type handle 11 rigidly secured thereto and centrally and longitudinally disposed with respect thereto. The longitudinal edges e of said central supporting member 10 are formed with semi-circular notches 12 equally spaced along its edges, corresponding with the spacing of the bottles in the rows in the shipping case, and is preferably of a width that permits it to be inserted between two rows of bottles B (see Fig. 3) with said edges of said notches 12 partially surrounding the necks of the bottles of two adjacent rows. The opposing edges e of the outer supporting members 10a and 10b are correspondingly notched, as at 12', which complement the notches 12 so as to form apertures A which will receive the necks of bottles B and which apertures are sufficiently large to permit the lip or bead 1 and the enlarged collar c— usually provided around the mouth of the bottle—to pass therethrough even when the member 10a and 10b are moved to bring the opposing edges e of said supporting members in contact as shown in full lines in Fig. 3. It will be noted that the width of the supporting members 10a and 10b is about one-half of that of the center supporting member 10.

As above stated, the outer supporting members 10a and 10b are mounted to move toward and away from the supporting member 10 to diminish or enlarge the apertures A. One manner in which this may be accomplished, and for retaining the supporting members 10, 10a and 10b in their relationship, is illustrated particularly in Figs. 1, 2 and 4, where lateral extending projections 13 protrude from the corner portions of the central supporting member 10 and in the plane of the member 10, and have guide channels 14 in their inner surfaces into which the marginal end portions of the outer supporting members 10a and 10b extend with a sliding fit. To assure alignment and easy operation of the outer supporting members 10a and 10b their marginal end portions may be provided with closed transverse slots 15 through which extend guide pins or screws 16 carried by the protruding projections 13. These slots 15 and pins 16 may also limit the lateral movement of the outer supporting members 10a and 10b. Also, the channels 14 may be provided in any convenient manner, such as bending, stamping or the like.

Thus, it will be seen that the outer supporting members 10a and 10b are movable toward the central supporting member 10 so that the opposing edges e abut and their complemented notches 12 and 12' coincide to form apertures A for freely receiving the necks of bottles and permitting them to pass therethrough even when the edges e are in contact. This relative positioning of the supporting members 10, 10a and 10b is shown in Figs. 2 and 3.

The gripping of the bottle is accomplished by a flexible resilient element 17 there shown in the form of helical springs, mounted on and extending longitudinally of the supporting members 10, 10a and 10b in parallel relationship and chordally across of the notches 12 and 12' in advance of their rear closed or back portions thereof, respectively, so that, when the edges e of the supporting members are moved into contacting relationship, the flexible resilient gripping members 17 will be spaced apart a distance less than the diameter of the neck of the bottles B below their lip or bead l and collar c and will be flexed and bowed around the necks of the bottles B in gripping relation therewith, as shown in Fig. 3.

The resilient gripping members 17 afford the advantage of gripping the neck of the bottle sufficiently to lift the bottle, when brought under the collar c of the bottle, if the bottle is free; but, in the event that the bottle is stuck or wedged within its compartment in the shipping case then the gripping members will be further flexed outwardly, under the strain of the lifting pull, to permit the enlarged collar c or the lip l to pass the gripping members 17, thus releasing the stuck bottle without causing the grips of adjacent bottles in that row to be relaxed sufficiently to release the adjacent bottles. As a consequence, the operator does not have to release the device or test the various bottles by hand to determine which is the stuck bottle but can pick up all bottles that are not stuck.

In actual practice, the resilient gripping elements 17 may partake of any form that will perform the functions described, but there is particular advantage in economy and performance in forming them of a single helical spring on each supporting member 10, 10a and 10b and arranging it longitudinally over each series of notches 12 or 12' of its supporting member as shown and described above. The ends of each single spring 17 may be anchored on posts 18 adjacent each end of its supporting member and, also, they are anchored, as at 19, between each of the notches 12 or 12' to hold the intermediate portion of the spring 17 between each notch against outward movement. In installing the springs 17, they are wound tightly and compressed endwise to bring their convolutions together and in contact and are positioned in that condition on the members 10, 10' and 10b, as shown, by the post 18, which may comprise screw studs removably threaded into said supporting members. The anchors 19 may take the form of lugs struck upwardly from the surface of the supporting members 10, 10a and 10b and positioned on the sides of the springs to resist the pressure imposed upon the springs by the bottles, when gripping the bottles, or they may take the form of staples, as shown particularly in Fig. 6, which straddle the springs 17 and secured to the supporting member 10, 10a and 10b to firmly hold the end-wise compressed springs 17 down against the surface of and in position upon supporting members 10, 10a and 10b. However, as shown in Fig. 7, the supporting members 10', 10'' and 10''', may be made of plastic or other moldable material and the springs 17a (corresponding to the springs 17) may be embedded in said material. By compressing the springs 17 and 17a and mounting them, as above described, the springs have a snapping action when their convolutions are moved out of alignment by the necks of bottles extending between them.

To effect the gripping action of the gripping element 17, the opposite faces of the legs of the bail handle 11 is slotted, as at 20, to slidingly receive the flattened ends 21 of an operating hand-bar 22 positioned beneath the horizontal portion h of the bail handle and parallel thereto. The operating bar 22 is operatively connected with the movable supporting member 10a and 10b to move them inwardly to bring their edge e against the opposing edges e of the supporting member 10 when the bar 22 is raised.

The operative connection between the hand-bar 22 and the movable supporting members 10a and 10b may comprise a strap 23 (Figs. 5 and 6) that is looped around the bar 22 at the central portion thereof and positioned between soft or yieldable tubular covers 22a surrounding the bar 22. The strap 23 is twisted at right angles and has the upper ends of a pair of toggle links 24 pivotally connected to its lower end as at 25. The lower ends of the toggle links 24 are pivoted, as at 26, to the upper ends, respectively, of a pair of scissors or cross lever 27 which project through the slots 28 in and fulcrumed on the horizontal pivot 29 on the central supporting member 10. Each of the scissors levers 27 is connected to one of the outer supporting members 10a and 10b, respectively, by links 30 which are pivoted at their outer ends to arms 31 extending from the bottom of the supporting members 10a and 10b.

As can be seen from Fig. 6, the operating hand-bar 22 lies within grasp of the fingers of the operator's hand when grasping the device by the bail-handle 11, so that contraction of the operator's fingers, while the palm of his hand bears upon bail, will raise the bar 22 and through the above described linkage will move the movable supporting members 10a and 10b toward the center member 10 and their opposing edge e into contact so that the resilient gripping elements 17 are moved into gripping contact with two rows of spaced bottles B under their collars c and, upon lifting the device, all the bottles may be removed and be suspended from the device in their same relative spaced positions as they assumed in said case.

Upon setting down the bottles so lifted by said device and releasing the operating hand-bar 22, tension springs 32, connected at one end to the strap 23 and at their other ends to the member 29, will exert a downward pull on the hand-bar 22 toward the supporting member 10 and cause the toggle links 23, the scissors levers 27 and the links 30 to push supporting members 10a and 10b outwardly from the central supporting member 10 to separate the resilient grips 17 and release the bottles.

As the handle-grasp bar 22 has a limited movement by reason of the slot 20 in the bail-handle 11, adjustment of the bail 11 toward and from the supporting members will carry the extent of movement of the above described linkage and, as a consequence, the allowable opening and closing distances of the supporting members 10a and 10b relative to the member 10, thus resulting in regulation of the pressure which springs 17 may exert on each side of the bottle B being picked-up. To this end the ends of the bail 11 are adjustably secured to the member 10. One manner in which this adjustment may be accomplished, is for the ends 11a of the bail being threaded and extending through opening 32 in the supporting member 10 and clamped to the latter by binding nuts 33 threaded on the end 11a and on opposite sides of said member 10.

While the present disclosure illustrates three supporting members 10, 10a and 10b, two or more may be employed in the bottle handling device of this invention. The device illustrated will pick up 12 bottles (usually one-half case) at one time. In most instances to pick up 24 bottles at a time continuously during the "work-day" hours is very fatiguing to the worker. However, the invention lends itself the modification just mentioned.

Also, while one set of the above described linkage is shown as centrally located on the grasp-bar 22 and the pivot bar 29, it is to be understood that two sets of such linkage may be employed—i. e., one set at or near each end of the grasp-bar 22 and pivot bar 29.

Although one embodiment of the invention has been shown and described it is obvious that many modifications are possible without departing from the spirit of the invention. The invention, therefore, is not to be restricted except insofar as is necessitated by the prior art and by the spirit of the appended claims.

That which I claim, as new, is:

1. A bottle carrier comprising a supporting member including a handle and having a plurality of spaced notches in two opposed edges, an auxiliary supporting member on each side of said supporting member and mounted for movement toward and away from the notched edges thereof, said auxiliary supporting members having a plurality of notches in their edges adjacent and complemental to the notches in said first supporting member and forming therewith at all times openings of a size to freely pass the heads of bottles, and resilient gripping means carried by each of the supporting members and having portions thereof protruding within the confines of said notches and other portions fixedly mounted in position on said members so that said resilient means will grip and hold from opposite sides the neck ends of bottles extending through the openings formed by said notches and, while in said gripping position, will release any bottle resisting said grip sufficiently to overcome the resilient tension of said gripping means and allow its neck end to withdraw through its said opening, when said auxiliary supporting members are positioned toward said first supporting member in bottle gripping position and said carrier is raised to lift the bottles, and manually operable means on the carrier for moving said auxiliary supporting members at will into and out of bottle gripping position.

2. A bottle carrier comprising a supporting member including a handle and having a plurality of spaced notches in two opposed edges, an auxiliary support member on each side of said supporting member and mounted for movement toward and away from the notched edges thereof, said auxiliary supporting members having a plurality of notches in their edges adjacent and complemental to the notches in said first supporting member and forming therewith at all times openings of a size to freely pass the heads of bottles, and resilient gripping means carried by each of the supporting members and protruding within the confines of said notches and positioned to grip and hold from opposite sides the neck ends of bottles extending through the openings formed by said notches and, while in said position, to release any bottle resisting said grip sufficiently to overcome the resilient tension of said gripping means and allow its neck end to withdraw through its said opening, when said auxiliary supporting members are positioned toward said first supporting member in bottle gripping position and said carrier is raised to lift the bottles, said handle has an operable hand-grasp member connected to the auxiliary supporting members which move the latter toward said first supporting member, to bring the resilient gripping means into operative relationship.

3. A bottle carrier comprising a supporting member including a handle and having a plurality of spaced notches in two opposed edges, an auxiliary support member on each side of said supporting member and mounted for movement toward and away from the notched edges thereof, said auxiliary supporting members having a plurality of notches in their edges adjacent and complemental to the notches in said first supporting member and forming therewith at all times openings of a size to freely pass the heads of bottles, and resilient gripping means carried by each of the supporting members and protruding within the confines of said notches and positioned to grip and hold from opposite sides the neck ends of bottles extending through the openings formed by said notches and, while in said position, to release any bottle resisting said grip sufficiently to overcome the resilient tension of said gripping means and allow its neck end to withdraw through its said opening, when said auxiliary supporting members are positioned toward said first supporting member in bottle gripping position and said carrier is raised to lift the bottles, said handle has an operable hand-grasp member connected to the auxiliary supporting members and, which upon being lifted, moves said auxiliary supporting members toward said first supporting member to bring the resilient gripping means into gripping engagement with opposite sides of the bottles therebetween, and biasing means to move said auxiliary supporting members away from each other to release the bottles, when hand grasp member is released.

4. A bottle carrier as set forth in claim 1 wherein the resilient gripping means comprises an elongated helical spring extending parallel to the adjacent edge of each supporting member and spanning the notches spaced along its edges inwardly of their closed ends.

5. A bottle handling device comprising a plurality of supporting members disposed to lie on opposite sides of one or more neck portions of bottles extending therebetween, said members being mounted for relative movement toward and away from the bottles extending between adjacent members, and yieldable resilient gripping means fixedly mounted on said supporting members in such positions thereon that opposing gripping means only will grip the bottles when said supporting members are moved toward each other, the relation of said gripping means and supporting members being such that the latter are spaced from the bottles, when the bottle gripping means is in gripping position, sufficiently to permit the neck and head end of the bottle to pass therethrough against the yielding pressure of said resilient gripping means.

6. A bottle handling device comprising a plurality of supporting members disposed and mounted for relative movement toward each other into bottle gripping relation and away from each other into bottle releasing relation, said supporting members having coinciding complemental notched portions in their adjacent edges and which define openings each to receive the head and neck of a bottle and dimensioned to permit the head and neck to pass therethrough at all times, and yieldable resilient gripping members fixedly mounted on said supporting members and positioned relative to said notches to yieldably grip and hold the neck ends of bottles extended through said openings and which while said supporting members are in bottle gripping relation will release any bottle resisting said grip sufficiently to overcome the resilient gripping tension of said gripping members.

7. A bottle handling device comprising a plurality of supporting members disposed in planar alignment and mounted for relative movement toward each other into bottle gripping relation and away from each other into bottle releasing relation, said supporting members having coinciding notched portions in their adjacent edges and which define openings each to receive the head and neck of a bottle and dimensioned to permit the head and neck to pass therethrough at all times, helical springs fixedly mounted on said supporting members and extending chordally across said notches to yieldably grip the necks of said bottles extending through said openings, when said supporting members are moved toward each other into gripping relation.

8. A bottle handling device comprising a plurality of supporting members disposed in planar alignment and mounted for relative movement planarly toward each other into bottle gripping relation and away from each other into bottle releasing relation, said supporting members having coinciding notched portions in their adjacent edges and which define openings each to receive the head and neck of a bottle and dimensioned to permit the head and neck to pass therethrough at all times, elongated helical springs, one mounted on each supporting member and extending longitudinally thereof with portions chordally bisecting said notches, said springs being fixedly anchored at their ends and at points between said notches, whereby said spring will yieldably grip the neck ends of bottles extending through said openings when said supporting members are moved toward each other into gripping relation.

9. A bottle handling device comprising a plurality of supporting members disposed to lie on opposite sides of one or more neck portions of bottles extending therebetween, means mounting said members for relative movement toward and away from the bottles extending between adjacent members, and elongated helical springs, one extending longitudinally of the opposing side of each member and anchored to said member at spaced points in its length between its bottle gripping portions, each of said springs being in such position on its member that opposing springs only, on opposite members, will grip the bottles when said members are moved toward each other, the relation of said springs and supporting members being such that the latter are spaced sufficiently from the bottles, when said springs are in gripping position, to permit the neck and head end of the bottle to pass therebetween against the yielding pressure of said springs.

10. A bottle carrier comprising a supporting member including a handle and having a plurality of spaced notches in two opposed edges, an auxiliary support member on each side of said supporting member and mounted for movement toward and away from the notched edges thereof, said auxiliary supporting members having a plurality of notches in their edges adjacent and complemental to the notches in said first supporting member and forming therewith at all times openings of a size to freely pass the heads of bottles, and resilient gripping means carried by each of the supporting members and protruding within the confines of said notches and positioned to grip and hold from opposite sides the neck ends of bottles extending through the openings formed by said notches and, while in said position, to release any bottle resisting said grip sufficiently to overcome the resilient tension of said gripping means and allow its neck end to withdraw through its said opening, when said auxiliary supporting members are positioned toward said first supporting member in bottle gripping position and said carrier is raised to lift the bottles, said handle is of the bail-type having its legs adjustably secured to said first mentioned supporting member, and includes an operable grasp member slidably mounted in slots in the legs of said handle and extending between the same, a linkage connecting said grasp member to the auxiliary supporting members to move the latter toward said first mentioned supporting member to bring the resilient gripping means into gripping engagement with the bottles therebetween and biasing means to move said auxiliary supporting members away from each other to release the bottles when said hand grasp member is released.

11. A bottle carrier comprising a central supporting member having spaced notches in two opposed sides thereof, a pair of auxiliary supporting members on the opposite sides of said supporting members and movable relative thereto, said auxiliary supporting members having notches in their sides adjacent said central supporting member, the notches in the adjacent edges of said supporting members coinciding to form bottle receiving openings, a handle connected with said central supporting member and having a grasp member movable relative thereto, and toggle linkage connected with said grasp member and with said auxiliary supporting members, said toggle linkage including intermediary scissor levers that extend through a slot in said central member and are centrally pivoted on a fixed pivot of said central member, whereby movement of said grasp member will operate said toggle linkage to move said auxiliary supporting members relative to said central member, said handle being adjustable toward and from said central supporting member whereby the movement of said linkage may be varied to adjust the extent of the opening and closing movement of said auxiliary supporting members.

12. A bottle carrier of the character described for bottles having heads wider than their neck portions, including, in combination, complemental supporting members having complemental notches and at least one mounted for movement into position close to and away from the other, said notches being of such dimensions that in all relative positions of the supporting members the complemental notches define openings sufficiently large to pass the heads of bottles therethrough, and yieldable, resilient gripping means fixedly mounted on each of said supporting members and so positioned in relation to said notches that, when the supporting members are positioned close to each other in bottle gripping position, said gripping means grip from opposite sides neck portions of bottles extending through said openings with sufficient force to lift the bottles by their heads when unrestrained against being lifted and adapted to slide upwardly off of and release any bottle that is unduly restrained against being lifted when the bottle carrier is lifted.

13. A bottle carrier of the character described for bottles having heads wider than their neck portions, said carrier including a central bottle gripping member and a sidewise adjacent bottle gripping member on each side of the central bottle gripping member mounted on the carrier to be movable from and toward said central member edgewise, the opposite edges of said central member having notches and the facing edges of said side members having notches complemental to the notches of the central member, the complemental notches of the central and side members forming apertures sufficiently large to pass the relatively wide heads of bottles therethrough in all positions of said side members relative to said central member, and each side member on the side facing the central member carrying resilient gripping means extending within the confines of the notches of its said member and fixedly mounted in such position on its member that, when a side member is moved to a certain closeness to the central member in bottle gripping position, the resilient gripping means of said central and side members are brought into gripping engagement with the opposite sides of the neck of a bottle in the aperture provided by said complemental notches and beneath the bottle head with tension effective to lift an unrestrained bottle, when the carrier is raised, and to release a bottle unduly restrained against being lifted, and means on the carrier and connected to said side members and operable to move the side members toward and from the central member and to place said gripping means into and out of lifting gripping engagement with the neck of a bottle disposed in the aperture provided by the complemental notches of the central and side member.

ARTHUR O. REINKING.

REFERENCES CITED

The following references are of record in the file of this patent:

UNITED STATES PATENTS

| Number | Name | Date |
| --- | --- | --- |
| 1,005,235 | Langguth | Oct. 10, 1911 |
| 1,683,190 | Hughey et al. | Sept. 4, 1928 |
| 1,828,416 | Kane et al. | Oct. 20, 1931 |
| 1,898,393 | Rickers | Feb. 21, 1933 |
| 1,918,486 | Onos | July 18, 1933 |
| 2,031,866 | Thums | Feb. 25, 1936 |
| 2,080,947 | Ligeour | May 18, 1937 |
| 2,341,496 | Zethmayr | Feb. 8, 1944 |
| 2,386,859 | Hutaff, Jr. | Oct. 16, 1945 |
| 2,401,578 | Miller | June 4, 1946 |
| 2,409,357 | Jackson | Oct. 15, 1946 |